(12) United States Patent
Uluski et al.

(10) Patent No.: US 9,703,482 B2
(45) Date of Patent: Jul. 11, 2017

(54) FILTER APPLIANCE FOR OBJECT-BASED STORAGE SYSTEM

(75) Inventors: Derek Uluski, Cambridge, MA (US); Nagendra Tomar, Bangalore (IN); Gourav Sakargayan, Bangalore (IN); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 641 days.

(21) Appl. No.: 13/539,139

(22) Filed: Jun. 29, 2012

(65) Prior Publication Data

US 2014/0006731 A1    Jan. 2, 2014

(51) Int. Cl.
*G06F 12/00* (2006.01)
*G06F 3/06* (2006.01)
*G06F 9/455* (2006.01)

(52) U.S. Cl.
CPC ............ *G06F 3/0604* (2013.01); *G06F 3/067* (2013.01); *G06F 3/0659* (2013.01); *G06F 9/45558* (2013.01); *G06F 12/00* (2013.01); *G06F 3/0665* (2013.01); *G06F 2009/45579* (2013.01)

(58) Field of Classification Search
CPC ....................................................... G06F 12/00
USPC ....................................................... 711/155
See application file for complete search history.

(56) References Cited

U.S. PATENT DOCUMENTS

| | | | |
|---|---|---|---|
| 7,076,690 B1 * | 7/2006 | Todd et al. ...................... 714/13 |
| 7,155,558 B1 | 12/2006 | Vaghani et al. | |
| 7,849,098 B1 | 12/2010 | Scales et al. | |
| 8,326,803 B1 * | 12/2012 | Stringham ...................... 707/652 |
| 8,490,086 B1 * | 7/2013 | Cook .................... G06F 9/45558 718/1 |
| 2009/0089879 A1 * | 4/2009 | Wang et al. ...................... 726/24 |
| 2009/0150581 A1 * | 6/2009 | Chimitt ................. G06F 3/0604 710/74 |
| 2009/0254990 A1 * | 10/2009 | McGee ................... G06F 21/51 726/22 |
| 2011/0099204 A1 * | 4/2011 | Thaler .......................... 707/797 |
| 2011/0265083 A1 * | 10/2011 | Davis .................................. 718/1 |
| 2011/0314279 A1 * | 12/2011 | Ureche et al. ................ 713/167 |
| 2012/0311573 A1 * | 12/2012 | Govindaraju ......... G06F 3/0605 718/1 |
| 2013/0054932 A1 | 2/2013 | Acharya et al. | |
| 2013/0282997 A1 * | 10/2013 | Suzuki et al. ................. 711/162 |

* cited by examiner

*Primary Examiner* — Tuan Thai
*Assistant Examiner* — Gautam Sain
(74) *Attorney, Agent, or Firm* — Patterson & Sheridan LLP

(57) ABSTRACT

A framework for performing transformations of logical storage volumes in software is provided. This framework interposes on various operations that can be performed on a logical storage volume, such as input/output (IO) operations, via one or more filters, which may be implemented by an appliance that is inserted into the data path of the operations issued to the logical storage volume.

17 Claims, 13 Drawing Sheets

FILTER APPLIANCE FOR OBJECT-BASED STORAGE SYSTEM

BACKGROUND

As computer systems scale to enterprise levels, particularly in the context of supporting large-scale data centers, the underlying data storage systems frequently employ a storage area network (SAN) or network attached storage (NAS). As is conventionally well appreciated, SAN or NAS provides a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

SCSI and other block protocol-based storage devices, such as a storage system 30 shown in FIG. 1A, utilize a storage system manager 31, which represents one or more programmed storage processors, to aggregate the storage units or drives in the storage device and present them as one or more LUNs (Logical Unit Numbers) 34 each with a uniquely identifiable number. LUNs 34 are accessed by one or more computer systems 10 through a physical host bus adapter (HBA) 11 over a network 20 (e.g., Fibre Channel, etc.). Within computer system 10 and above HBA 11, storage access abstractions are characteristically implemented through a series of software layers, beginning with a low-level device driver layer 12 and ending in an operating system specific file system layers 15. Device driver layer 12, which enables basic access to LUNs 34, is typically specific to the communication protocol used by the storage system (e.g., SCSI, etc.). A data access layer 13 may be implemented above device driver layer 12 to support multipath consolidation of LUNs 34 visible through HBA 11 and other data access control and management functions. A logical volume manager 14, typically implemented between data access layer 13 and conventional operating system file system layers 15, supports volume-oriented virtualization and management of LUNs 34 that are accessible through HBA 11. Multiple LUNs 34 can be gathered and managed together as a volume under the control of logical volume manager 14 for presentation to and use by file system layers 15 as a logical device.

FIG. 1B is a block diagram of a conventional NAS or file-level based storage system 40 that is connected to one or more computer systems 10 via network interface cards (NIC) 11' over a network 21 (e.g., Ethernet). Storage system 40 includes a storage system manager 41, which represents one or more programmed storage processors. Storage system manager 41 implements a file system 45 on top of physical, typically disk drive-based storage units, referred to in FIG. 1B as spindles 42, that reside in storage system 40. From a logical perspective, each of these spindles can be thought of as a sequential array of fixed sized extents 43. File system 45 abstracts away complexities of targeting read and write operations to addresses of the actual spindles and extents of the disk drives by exposing to connected computer systems, such as computer systems 10, a namespace comprising directories and files that may be organized into file system level volumes 44 (hereinafter referred to as "FS volumes") that are accessed through their respective mount points.

It has been recognized that the storage systems described above are not sufficiently scalable to meet the particular needs of virtualized computer systems. For example, a cluster of server machines may service as many as 10,000 virtual machines (VMs), each VM using a multiple number of "virtual disks" and a multiple number of "snapshots," each which may be stored, for example, as a file on a particular LUN or FS volume. Even at a scaled down estimation of 2 virtual disks and 2 snapshots per VM, this amounts to 60,000 distinct disks for the storage system to support if VMs were directly connected to physical disks (i.e., 1 virtual disk or snapshot per physical disk). In addition, storage device and topology management at this scale are known to be difficult. As a result, the concept of datastores in which VMs are multiplexed onto a smaller set of physical storage entities (e.g., LUN-based VMFS clustered file systems or FS volumes), such as described in U.S. Pat. No. 7,849,098, entitled "Providing Multiple Concurrent Access to a File System," incorporated by reference herein, was developed.

In conventional storage systems employing LUNs or FS volumes, workloads from multiple VMs are typically serviced by a single LUN or a single FS volume. As a result, resource demands from one VM workload will affect the service levels provided to another VM workload on the same LUN or FS volume. Efficiency measures for storage such as latency and input/output operations per second, or IOPS, thus vary depending on the number of workloads in a given LUN or FS volume and cannot be guaranteed. Consequently, storage policies for storage systems employing LUNs or FS volumes cannot be executed on a per-VM basis and service level agreement (SLA) guarantees cannot be given on a per-VM basis. In addition, data services provided by storage system vendors, such as snapshot, replication, encryption, and deduplication, are provided at a granularity of the LUNs or FS volumes, not at the granularity of a VM's virtual disk. As a result, snapshots can be created for the entire LUN or the entire FS volume using the data services provided by storage system vendors, but a snapshot for a single virtual disk of a VM cannot be created separately from the LUN or the file system in which the virtual disk is stored.

An object-based storage system disclosed in U.S. patent application Ser. No. 13/219,358, filed Aug. 26, 2011, incorporated by reference herein, provides a solution by exporting logical storage volumes that are provisioned as storage objects, referred to herein as "virtual volumes." These storage objects are accessed on demand by connected computer systems using standard protocols, such as SCSI and NFS, through logical endpoints for the protocol traffic that are configured in the storage system. Logical storage volumes are created from one or more logical storage containers having an address space that maps to storage locations of the physical data storage units. The reliance on logical storage containers provide users of the object-based storage system with flexibility in designing their storage solutions, because a single logical storage container may span more than one physical storage system and logical storage containers of different customers can be provisioned from the same physical storage system with appropriate security settings.

SUMMARY

One or more embodiments disclosed herein provide a framework for performing transformations of logical storage volumes in software, by interposing on various operations, such as input/output (IO) operations, that can be performed on a logical storage volume. In one embodiment, one or more filters are implemented to interpose on the operations, and the filters are implemented by an appliance that is inserted into the data path of the operations issued to the logical storage volume.

A method of interposing a filter in an IO path between an issuer of IO operations and a logical storage volume, according to an embodiment, includes the steps of creating a filtered logical storage container having properties defined by the filter within a filter appliance, and logically moving the logical storage volume from its current, unfiltered logical storage container to the filtered logical storage container such that IO operations in the IO path are redirected to the filter appliance for processing by the filter appliance. The filter appliance may include functionalities for any type of filter, such as a cache filter, a compression/decompression filter, and an encryption/decryption filter.

A method of interposing on operations targeted for execution on a logical storage volume, according to an embodiment, includes the steps of receiving a read operation targeted for execution on a first logical storage volume, issuing a read operation targeted for execution on a second logical storage volume, in place of the read operation targeted for execution on the first logical storage volume, to obtain read data from the second logical storage volume, executing at least one filtering operation on the read data to generate transformed data, and returning the transformed data in response to the received read operation.

A method of interposing on operations targeted for execution on a logical storage volume, according to another embodiment, includes the steps of receiving a write operation targeted for execution on a first logical storage volume, executing at least one filtering operation on data referenced in the received write operation to generate transformed data, issuing a write operation targeted for execution on a second logical storage volume, in place of the write operation targeted for execution on the first logical storage volume, to write the transformed data to the second logical storage volume, and returning a write acknowledgment in response to the received write operation upon receiving confirmation that the write operation targeted for execution on the second logical storage volume has completed.

A computer system according to an embodiment includes virtual machines (VMs) running therein, wherein one of the VMs is issuing IO operations and another of the VMs is a filter appliance that is configured to: (i) receive a read/write operation targeted for execution on a first logical storage volume, (ii) transform the read/write operation into a set of different operations including a read/write operation targeted for execution on a second logical storage volume, (iii) issue the read/write operation targeted for execution on the second logical storage volume, and (iv) return an indication of completion of the received read/write operation.

Embodiments further include a non-transitory computer-readable storage medium storing instructions that when executed by a computer system cause the computer system to perform one of the methods set forth above.

DETAILED DESCRIPTION

Figure 1A:
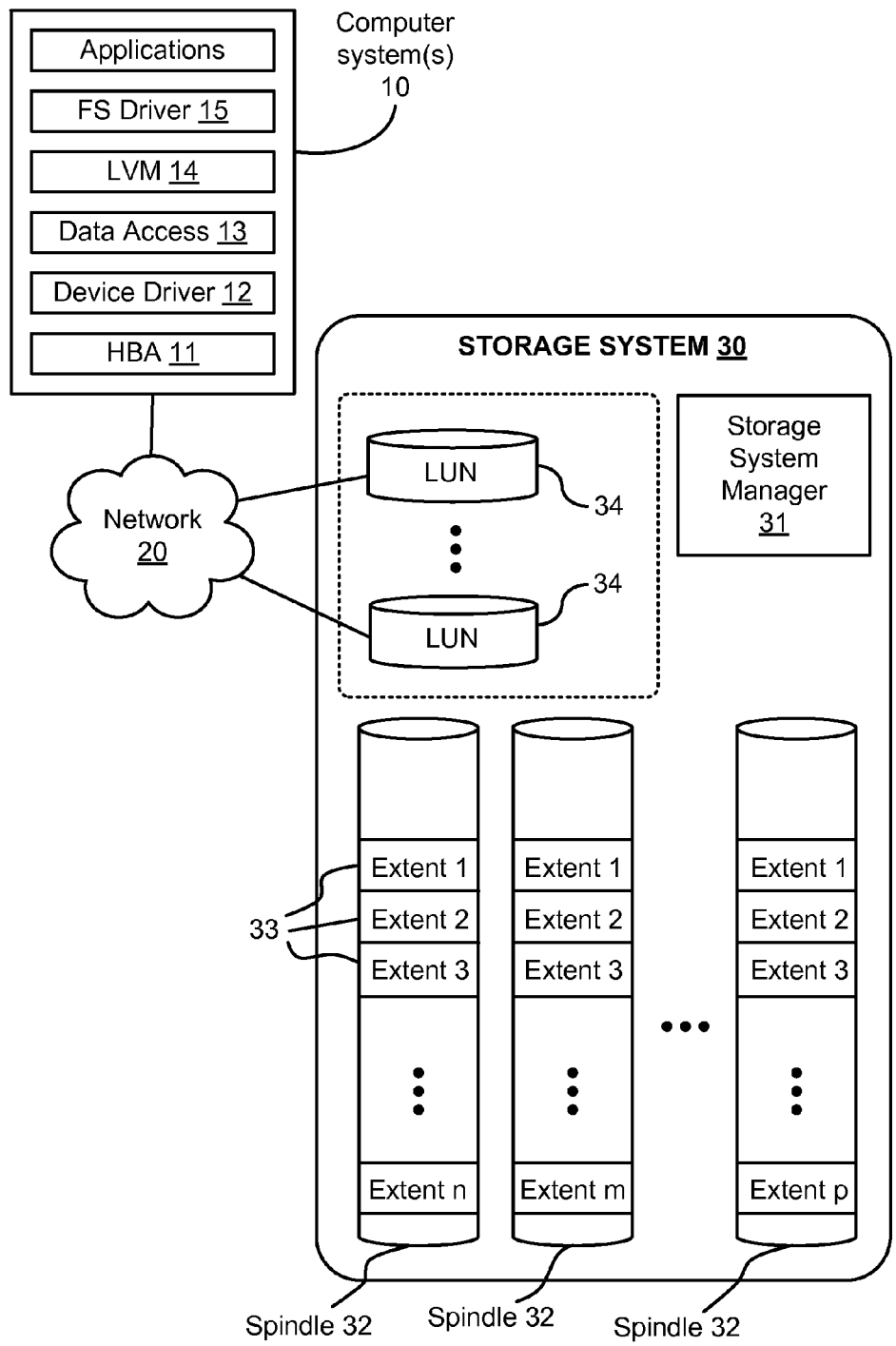
FIG. 1A is a block diagram of a conventional block protocol-based storage device that is connected to one or more computer systems over a network.
Figure 1B:
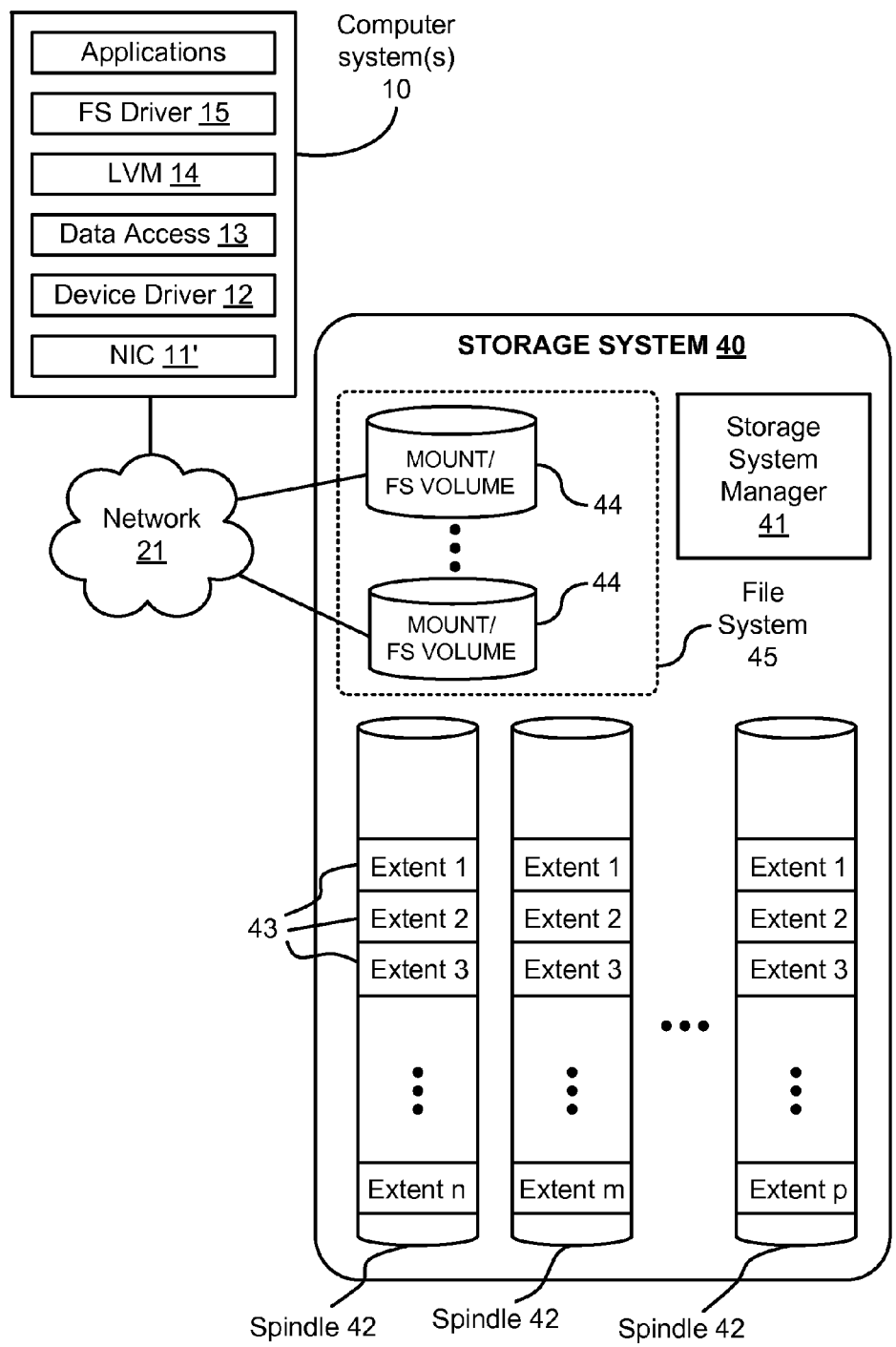
FIG. 1B is a block diagram of a conventional NAS device that is connected to one or more computer systems over a network.
Figure 2A:
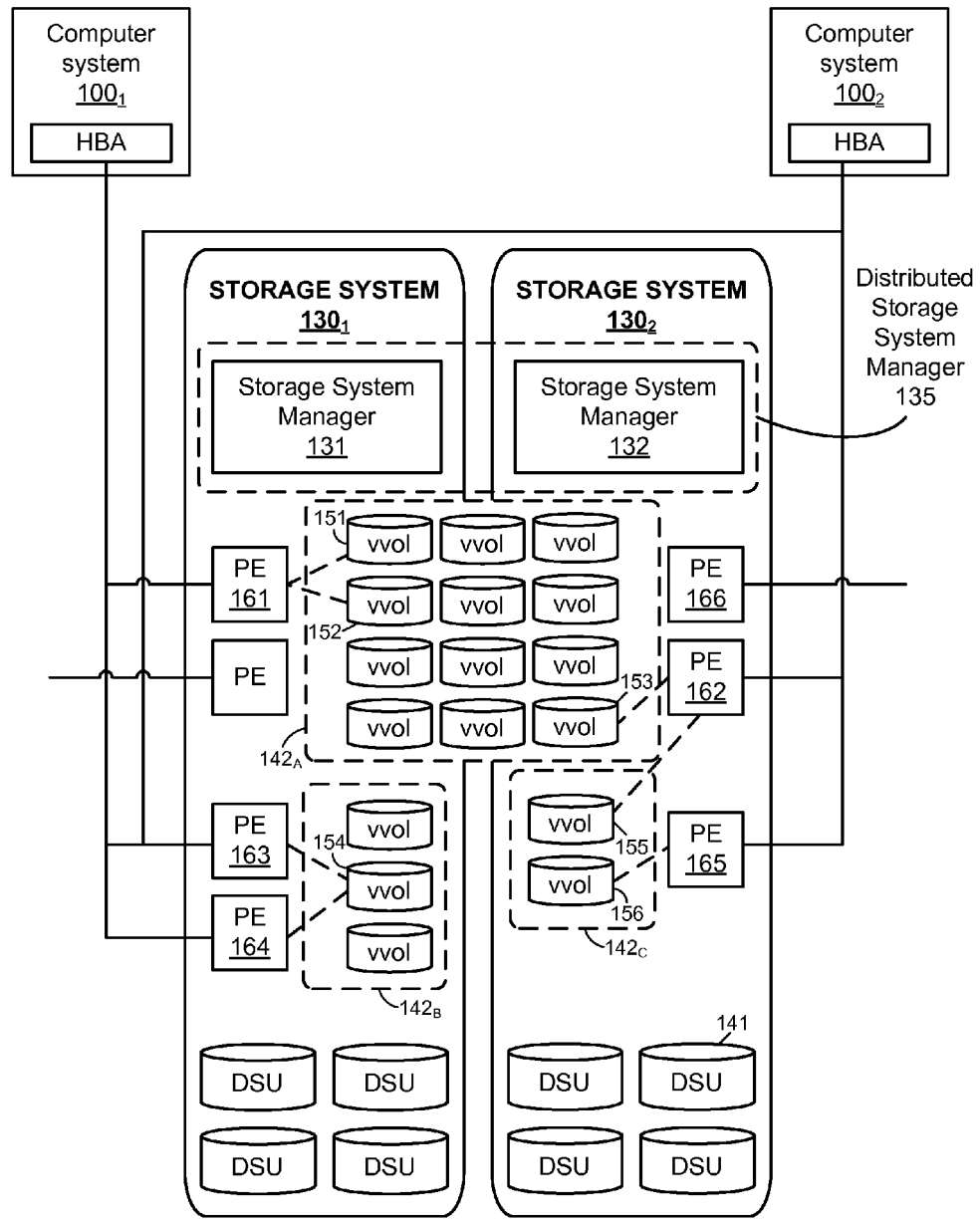
FIG. 2A is a block diagram of a block protocol-based storage system cluster that implements virtual volumes.
Figure 2B:
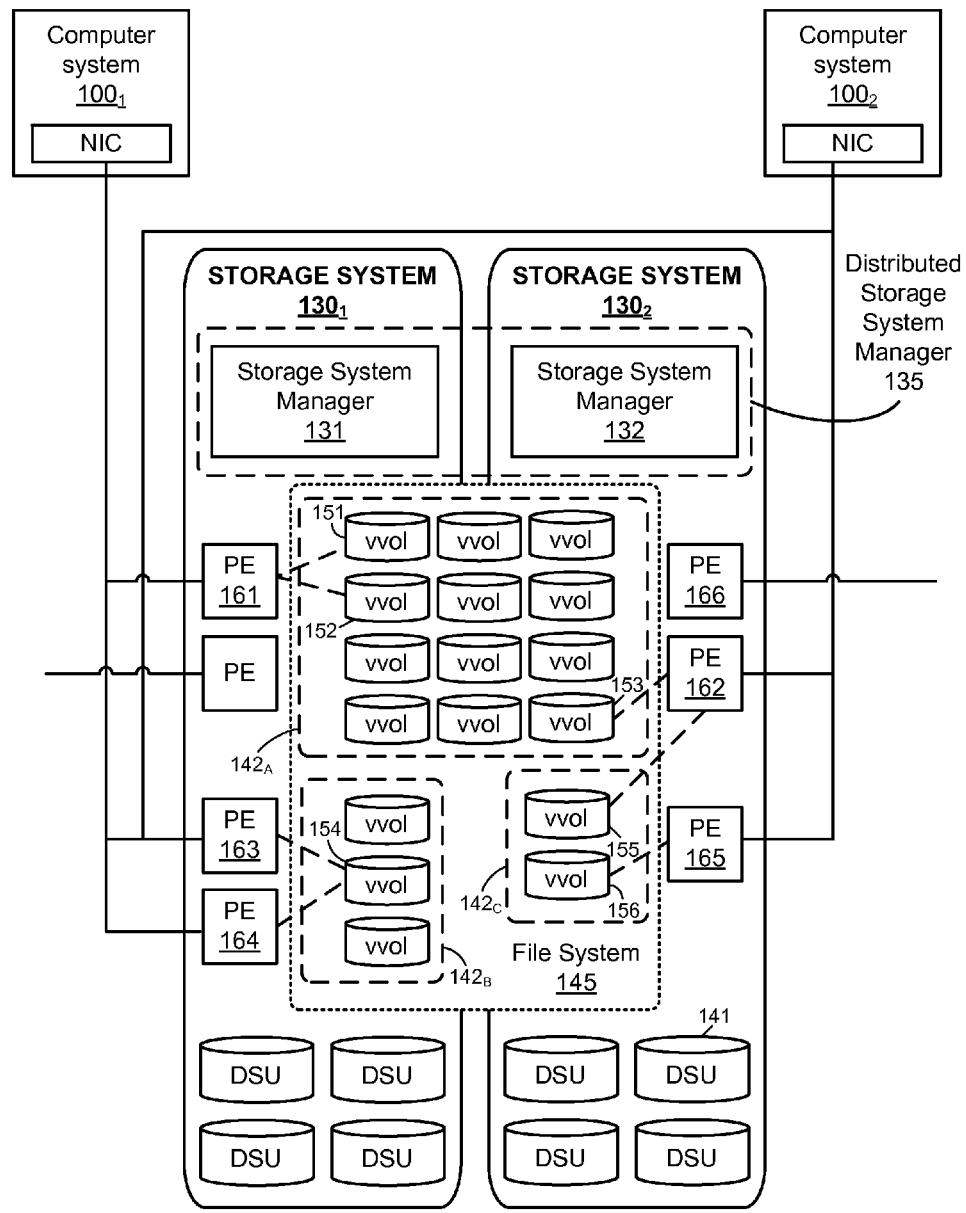
FIG. 2B is a block diagram of a NAS based storage system cluster that implements virtual volumes.

FIGS. 2A and 2B are block diagrams of a storage system cluster that implements virtual volumes, each of which may be transformed using the filter framework described herein. The storage system cluster includes one or more storage systems, e.g., storage systems $130_1$ and $130_2$, which may be disk arrays, each having a plurality of data storage units (DSUs), one of which is labeled as 141 in the figures, and storage system managers 131 and 132 that control various operations of storage systems 130. Two or more storage systems 130 may implement a distributed storage system manager 135 that controls the operations of the storage system cluster as if they were a single logical storage system. DSUs represent physical storage units, e.g., disk or flash based storage units such as rotating disks or solid state disks. The storage system cluster creates and exposes virtual volumes (vvols), as further detailed herein, to connected computer systems, such as computer systems $100_1$ and $100_2$. Applications (e.g., VMs accessing their virtual disks, etc.) running in computer systems 100 access the vvols on demand using standard protocols, such as SCSI in the embodiment of FIG. 2A and NFS in the embodiment of FIG. 2B, through logical endpoints for the SCSI or NFS protocol traffic, known as "protocol endpoints" (PEs), that are configured in storage systems 130. For simplicity, computer systems 100 are shown to be directly connected to storage systems 130. However, it should be understood that they may be connected to storage systems 130 through multiple paths and one or more of switches.

Distributed storage system manager 135 or a single storage system manager 131 or 132 may create vvols (e.g., upon request of a computer system 100, etc.) from logical "storage containers," which represent a logical aggregation of physical DSUs. In general, a storage container may span more than one storage system and many storage containers may be created by a single storage system manager or a distributed storage system manager. Similarly, a single storage system may contain many storage containers. In FIGS. 2A and 2B, storage container $142_A$ created by distributed storage system manager 135 is shown as spanning storage system $130_1$ and storage system $130_2$, whereas storage container $142_B$ and storage container $142_C$ are shown as being contained within a single storage system (i.e., storage system $130_1$ and storage system $130_2$, respectively). It should be recognized that, because a storage container can span more than one storage system, a storage system administrator can provision to its customers a storage capacity that exceeds the storage capacity of any one storage system. It should be further recognized that, because multiple storage containers can be created within a single storage system, the storage system administrator can provision storage to multiple customers using a single storage system.

In the embodiment of FIG. 2A, each vvol is provisioned from a block based storage system. In the embodiment of FIG. 2B, a NAS based storage system implements a file system 145 on top of DSUs 141 and each vvol is exposed to computer systems 100 as a file object within this file system. In addition, as will be described in further detail below, applications running on computer systems 100 access vvols for IO operations through PEs. For example, as illustrated in dashed lines in FIGS. 2A and 2B, vvol 151 and vvol 152 are accessible via PE 161; vvol 153 and vvol 155 are accessible via PE 162; vvol 154 is accessible via PE 163 and PE 164; and vvol 156 is accessible via PE 165. It should be recognized that vvols from multiple storage containers, such as vvol 153 in storage container $142_A$ and vvol 155 in storage container $142_C$, may be accessible via a single PE, such as PE 162, at any given time. It should further be recognized that PEs, such as PE 166, may exist in the absence of any vvols that are accessible via them.

In the embodiment of FIG. 2A, storage systems 130 implement PEs as a special type of LUN using known methods for setting up LUNs. As with LUNs, a storage system 130 provides each PE a unique identifier known as a WWN (World Wide Name). In one embodiment, when creating the PEs, storage system 130 does not specify a size for the special LUN because the PEs described herein are not actual data containers. In one such embodiment, storage system 130 may assign a zero value or a very small value as the size of a PE-related LUN such that administrators can quickly identify PEs when requesting that a storage system provide a list of LUNs (e.g., traditional data LUNs and PE-related LUNs), as further discussed below. Similarly, storage system 130 may assign a LUN number greater than 255 as the identifying number for the LUN to the PEs to indicate, in a human-friendly way, that they are not data LUNs. As another way to distinguish between the PEs and LUNs, a PE bit may be added to the Extended Inquiry Data VPD page (page 86h). The PE bit is set to 1 when a LUN is a PE, and to 0 when it is a regular data LUN. In the embodiment of FIG. 2B, the PEs are created in storage systems 130 using known methods for setting up mount points to FS volumes. Each PE that is created in the embodiment of FIG. 2B is identified uniquely by an IP address and file system path, also conventionally referred together as a "mount point." However, unlike conventional mount points, the PEs are not associated with FS volumes.

Figure 3:
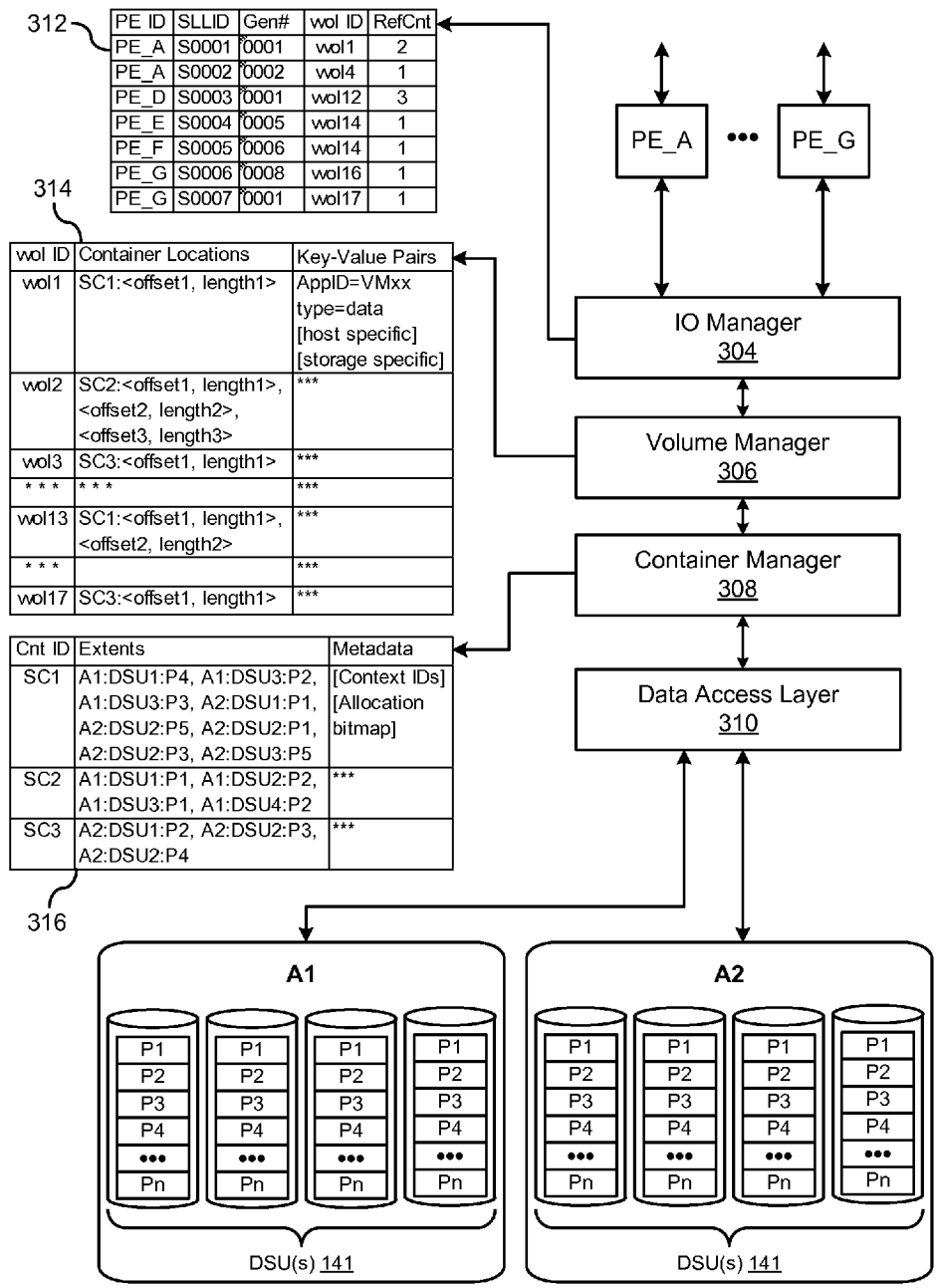
FIG. 3 is a block diagram of components of the storage system cluster of FIG. 2A or 2B for managing virtual volumes.

FIG. 3 is a block diagram of components of the storage system cluster of FIG. 2A or 2B for managing virtual volumes according to an embodiment. The components include software modules of storage system managers 131 and 132 executing in storage systems 130 in one embodiment or software modules of distributed storage system manager 135 in another embodiment, namely an IO manager 304, a volume manager 306, a container manager 308, and a data access layer 310. In the descriptions of the embodiments herein, it should be understood that any actions taken by distributed storage system manager 135 may be taken by storage system manager 131 or storage system manager 132 depending on the embodiment.

In the example of FIG. 3, distributed storage system manager 135 has created three storage containers SC1, SC2, and SC3 from DSUs 141, each of which is shown to have spindle extents labeled P1 through Pn. In general, each storage container has a fixed physical size, and is associated with specific extents of DSUs. In the example shown in FIG. 3, distributed storage system manager 135 has access to a container database 316 that stores for each storage container, its container ID, physical layout information and some metadata. Container database 316 is managed and updated by a container manager 308, which in one embodiment is a component of distributed storage system manager 135. The container ID is a universally unique identifier that is given to the storage container when the storage container is created. Physical layout information consists of the spindle extents of DSUs 141 that are associated with the given storage container and stored as an ordered list of <system ID, DSU ID, extent number>. The metadata section may contain some common and some storage system vendor specific metadata. For example, the metadata section may contain the IDs of computer systems or applications or users that are permitted to access the storage container. As another example, the metadata section contains an allocation bitmap to denote which <system ID, DSU ID, extent number> extents of the storage container are already allocated to existing vvols and which ones are free. In one embodiment, a storage system administrator may create separate storage containers for different business units so that vvols of different business units are not provisioned from the same storage container. Other policies for segregating vvols may be applied. For example, a storage system administrator may adopt a policy that vvols of different customers of a cloud service are to be provisioned from different storage containers. Also, vvols may be grouped and provisioned from storage containers according to their required service levels. In addition, a storage system administrator may create, delete, and otherwise manage storage containers, such as defining the number of storage containers that can be created and setting the maximum physical size that can be set per storage container.

Also, in the example of FIG. 3, distributed storage system manager 135 has provisioned (on behalf of requesting computer systems 100) multiple vvols, each from a different storage container. In general, vvols may have a fixed physical size or may be thinly provisioned, and each vvol has a vvol ID, which is a universally unique identifier that is given to the vvol when the vvol is created. For each vvol, a vvol database 314 stores for each vvol, its vvol ID, the container ID of the storage container in which the vvol is created, and an ordered list of <offset, length> values within that storage container that comprise the address space of the vvol. Vvol database 314 is managed and updated by volume manager 306, which in one embodiment, is a component of distributed storage system manager 135. In one embodiment, vvol database 314 also stores a small amount of metadata about the vvol. This metadata is stored in vvol database 314 as a set of key-value pairs, and may be updated and queried by computer systems 100 via the out-of-band path at any time during the vvol's existence. Stored key-value pairs fall into three categories. The first category is: well-known keys—the definition of certain keys (and hence the interpretation of their values) are publicly available. One example is a key that corresponds to the virtual volume type (e.g., in virtual machine embodiments, whether the vvol contains a VM's metadata or a VM's data). Another example is the App ID, which is the ID of the application that stored data in the vvol. The second category is: computer system specific keys—the computer system or its management module stores certain keys and values as the virtual volume's metadata. The third category is: storage system vendor specific keys—these allow the storage system vendor to store certain keys associated with the virtual volume's metadata. One reason for a storage system vendor to use this key-value store for its metadata is that all of these keys are readily available to storage system vendor plug-ins and other extensions via the out-of-band channel for vvols. The store operations for key-value pairs are part of virtual volume creation and other processes, and thus the store operation should be reasonably fast. Storage systems are also configured to enable searches of virtual volumes based on exact matches to values provided on specific keys.

IO manager 304 is a software module (also, in certain embodiments, a component of distributed storage system manager 135) that maintains a connection database 312 that stores currently valid IO connection paths between PEs and vvols. In the example shown in FIG. 3, seven currently valid IO sessions are shown. Each valid session has an associated PE ID, secondary level identifier (SLLID), vvol ID, and reference count (RefCnt) indicating the number of different applications that are performing IO through this IO session. The process of establishing a valid IO session between a PE and a vvol by distributed storage system manager 135 (e.g., on request by a computer system 100) is referred to herein as a "bind" process. For each bind, distributed storage system manager 135 (e.g., via IO manager 304) adds an entry to connection database 312. The process of subsequently tearing down the IO session by distributed storage system manager 135 is referred to herein as an "unbind" process. For each unbind, distributed storage system manager 135 (e.g., via IO manager 304) decrements the reference count of the IO session by one. When the reference count of an IO session is at zero, distributed storage system manager 135 (e.g., via IO manager 304) may delete the entry for that IO connection path from connection database 312. In one embodiment, the generation number is changed to a monotonically increasing number or a randomly generated number, when the reference count changes from 0 to 1 or vice versa. In another embodiment, the generation number is a randomly generated number and the RefCnt column is eliminated from connection database 312, and for each bind, even when the bind request is to a vvol that is already bound, distributed storage system manager 135 (e.g., via IO manager 304) adds an entry to connection database 312.

In the storage system cluster of FIG. 2A, IO manager 304 processes IO operations from computer systems 100 received through the PEs using connection database 312. When an IO operation is received at one of the PEs, IO manager 304 parses the IO operation to identify the PE ID and the SLLID contained in the IO operation in order to determine a vvol for which the IO operation was intended. By accessing connection database 314, IO manager 304 is then able to retrieve the vvol ID associated with the parsed PE ID and SLLID. In FIG. 3 and subsequent figures, PE ID is shown as PE_A, PE_B, etc. for simplicity. In one embodiment, the actual PE IDs are the WWNs of the PEs. In addition, SLLID is shown as S0001, S0002, etc. The actual SLLIDs are generated by distributed storage system manager 135 as any unique number among SLLIDs associated with a given PE ID in connection database 312. The mapping between the logical address space of the virtual volume having the vvol ID and the physical locations of DSUs 141 is carried out by volume manager 306 using vvol database 314 and by container manager 308 using container database 316. Once the physical locations of DSUs 141 have been obtained, data access layer 310 (in one embodiment, also a component of distributed storage system manager 135) performs the IO operation on these physical locations.

In the storage system cluster of FIG. 2B, IO operations are received through the PEs and each such IO operation includes an NFS handle (or similar file system handle) to which the IO operation has been issued. In one embodiment, connection database 312 for such a system contains the IP address of the NFS interface of the storage system as the PE ID and the file system path as the SLLID. The SLLIDs are generated based on the location of the vvol in the file system 145. The mapping between the logical address space of the vvol and the physical locations of DSUs 141 is carried out by volume manager 306 using vvol database 314 and by container manager 308 using container database 316. Once the physical locations of DSUs 141 have been obtained, data access layer performs IO operation on these physical locations. It should be recognized that for a storage system of FIG. 2B, container database 312 may contain an ordered list of file: <offset, length> entries in the Container Locations entry for a given vvol (i.e., a vvol can be comprised of multiple file segments that are stored in the file system 145).

In one embodiment, connection database 312 is maintained in volatile memory while vvol database 314 and container database 316 are maintained in persistent storage, such as DSUs 141. In other embodiments, all of the databases 312, 314, 316 may be maintained in persistent storage.

Figure 4:
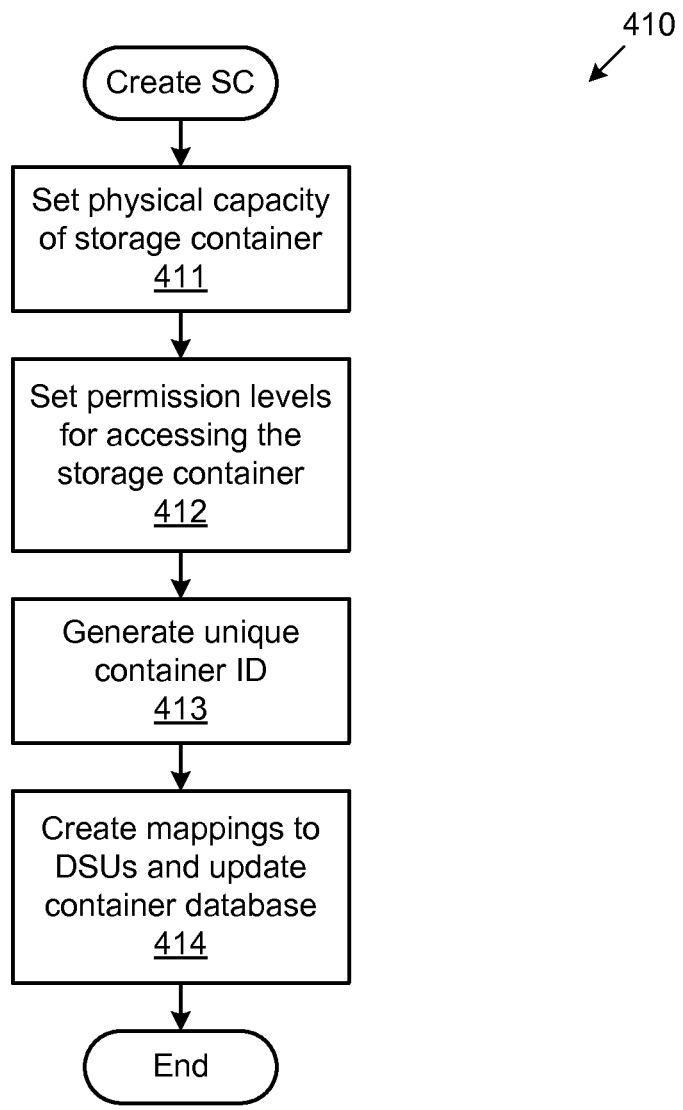
FIG. 4 is a flow diagram of method steps for creating a storage container.

FIG. 4 is a flow diagram of method steps 410 for creating a storage container. In one embodiment, these steps are carried out by storage system manager 131, storage system manager 132 or distributed storage system manager 135 under control of a storage administrator. As noted above, a storage container represents a logical aggregation of physical DSUs and may span physical DSUs from more than one storage system. At step 411, the storage administrator (via distributed storage system manager 135, etc.) sets a physical capacity of a storage container. Within a cloud or data center, this physical capacity may, for example, represent the amount of physical storage that is leased by a customer. The flexibility provided by storage containers disclosed herein is that storage containers of different customers can be provisioned by a storage administrator from the same storage system and a storage container for a single customer can be provisioned from multiple storage systems, e.g., in cases where the physical capacity of any one storage device is not sufficient to meet the size requested by the customer, or in cases such as replication where the physical storage footprint of a vvol will naturally span multiple storage systems. At step 412, the storage administrator sets permission levels for accessing the storage container. In a multi-tenant data center, for example, a customer may only access the storage container that has been leased to him or her. At step 413, distributed storage system manager 135 generates a unique identifier for the storage container. Then, at step 414, distributed storage system manager 135 (e.g., via container manager 308 in one embodiment) allocates free spindle extents of DSUs 141 to the storage container in sufficient quantities to meet the physical capacity set at step 411. As noted above, in cases where the free space of any one storage system is not sufficient to meet the physical capacity, distributed storage system manager 135 may allocate spindle extents of DSUs 141 from multiple storage systems. After the partitions have been allocated, distributed storage system manager 135 (e.g., via container manager 308) updates container database 316 with the unique container ID, an ordered list of <system number, DSU ID, extent number>, and context IDs of computer systems that are permitted to access the storage container.

According to embodiments described herein, storage capability profiles, e.g., SLAs or quality of service (QoS), may be configured by distributed storage system manager 135 (e.g., on behalf of requesting computer systems 100) on a per vvol basis. Therefore, it is possible for vvols with different storage capability profiles to be part of the same storage container. In one embodiment, a system administrator defines a default storage capability profile (or a number of possible storage capability profiles) for newly created vvols at the time of creation of the storage container and stored in the metadata section of container database 316. If a storage capability profile is not explicitly specified for a new vvol being created inside a storage container, the new vvol will inherit the default storage capability profile associated with the storage container.

Figure 5A:
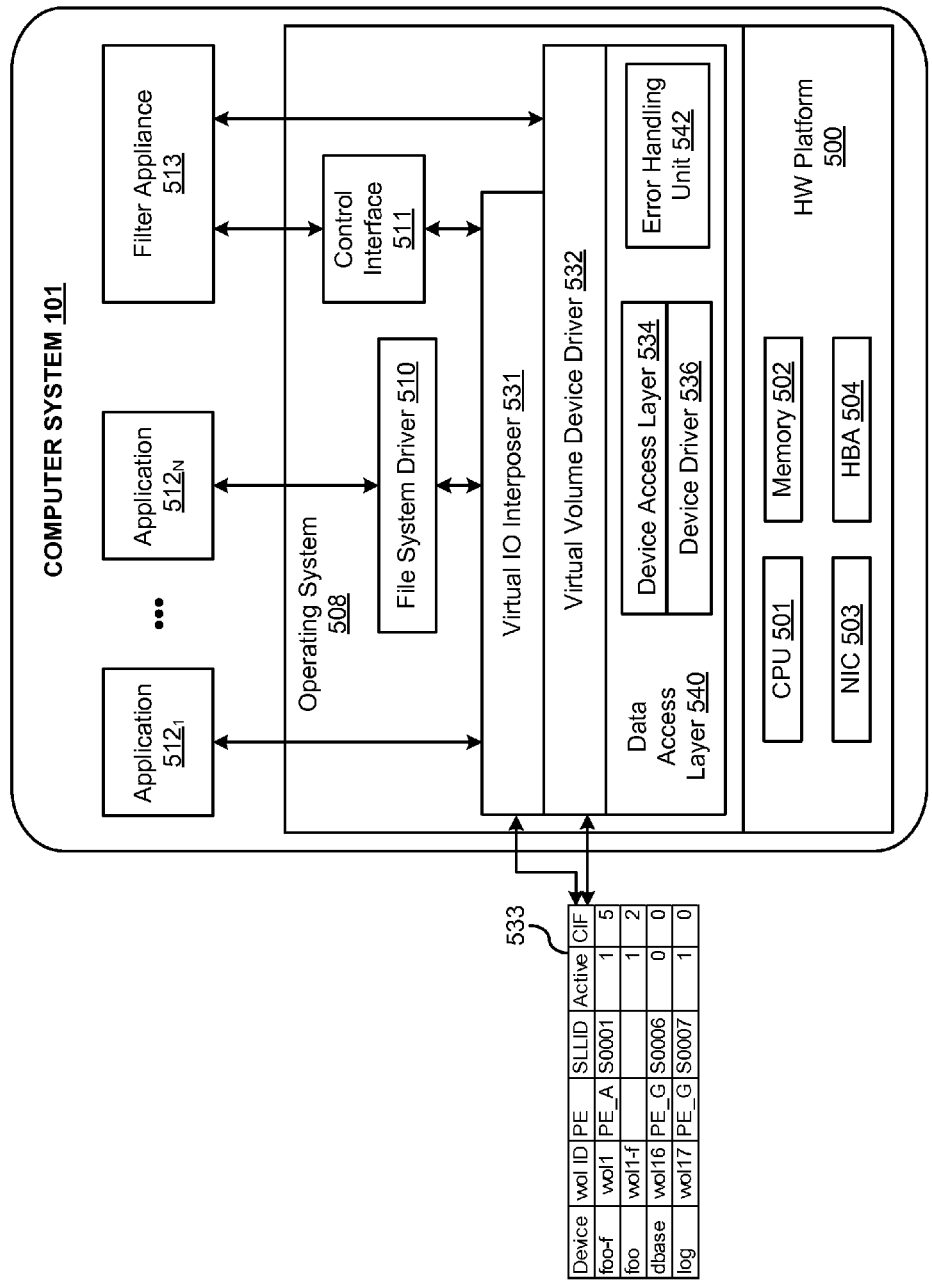
FIG. 5A is a block diagram of an embodiment of a computer system having a filter appliance and configured to implement virtual volumes hosted on a SAN-based storage system.

FIG. 5A is a block diagram of an embodiment of a computer system having a filter appliance and configured to implement virtual volumes hosted on a storage system cluster of FIG. 2A. Computer system 101 may be constructed on a conventional, typically server-class, hardware platform 500 that includes one or more central processing units (CPU) 501, memory 502, one or more network interface cards (NIC) 503, and one or more host bus adapters (HBA) 504. HBA 504 enables computer system 101 to issue IO operations to virtual volumes through PEs configured in storage devices 130. As further shown in FIG. 5A, operating system 508 is installed on top of hardware platform 500 and a number of applications $512_1$-$512_N$ and a filter appliance 513 are executed on top of operating system 508. Examples of operating system 508 include any of the well-known commodity operating systems, such as Microsoft Windows®, Linux®, and the like.

According to embodiments described herein, each application 512 has one or more vvols associated therewith and issues IO operations to block device instances of the vvols created by operating system 508 pursuant to "CREATE DEVICE" calls by application 512 into operating system 508. The association between block device names and vvol IDs are maintained in block device database 533. IO operations from applications $512_2$-$512_N$ are received by a file system driver 510, which converts them to block IO operations, and provides the block IO operations to a virtual IO interposer (VIOI) 531. IO operations from application $512_1$, on the other hand, are shown to bypass file system driver 510 and provided directly to VIOI 531, signifying that application $512_1$ accesses its block device directly as a raw storage device, e.g., as a database disk, a log disk, a backup archive, and a content repository, in the manner described in U.S. Pat. No. 7,155,558 entitled "Providing Access to a Raw Data Storage Unit in a Computer System," the entire contents of which are incorporated by reference herein.

Upon receipt of a block IO operation from one of applications 512, VIOI 531 determines whether or not the block device name specified in the block IO operation is associated with a filtered vvol with reference to block device database 533. In the example illustrated in FIG. 5A, the block device name "foo" is shown to be associated with a filtered vvol, vvol1-f (where the suffix "-f" is the nomenclature used herein to indicate that a certain vvol is a filtered vvol), whereas the block device names "dbase" and "log" are not associated with filtered vvols. If the block device name specified in the block IO operation is not associated with a filtered vvol, VIOI 531 passes the block IO operation to a virtual volume device driver 532. In turn, virtual volume device driver 532 accesses block device database 533 to reference a mapping between the block device name specified in the IO operation and the PE ID (WWN of PE LUN) and SLLID that define the IO connection path to the vvol associated with the block device name. Other information that is stored in block device database 533 includes an active bit value for each block device that indicates whether or not the block device is active, and a CIF (commands-in-flight) value. An active bit of "1" signifies that IO operations can be issued to the block device. An active bit of "0" signifies that the block device is inactive and IO operations cannot be issued to the block device. The CIF value provides an indication of how many IO operations are in flight, i.e., issued but not completed. In the example shown herein, the block device, foo, is active, and has some commands-in-flight. The block device, dbase, is inactive with no outstanding commands. Finally, the block device, log, is active, but the application currently has no pending IO operations to the device.

If the block device name specified in the block IO operation received by VIOI 531 is associated with a filtered vvol, VIOI 531 redirects the block IO operation to filter appliance 513 for processing through a control interface 511. Filter appliance 513 performs one or more filtering operations on the data referenced in the block IO operation. For reads, filter appliance 513 issues a block IO operation to virtual volume device driver 532 (identifying the block device name as "foo-f" in the example) and performs the filtering operations on the read data that is returned, and then passes the filtered read data back to VIOI 531 through control interface 511. For writes, filter appliance 513 transforms the write data that is referenced in the block IO operation by performing filtering operations thereon and issues a block IO operation to virtual volume device driver 532 (identifying the block device name as "foo-f" in the example) to write the transformed data. Then, upon receipt of a write acknowledgement, filter appliance 513 passes the write acknowledgement to VIOI 531 through control interface 511. For both reads and writes, upon receipt of the block IO operation from filter appliance 513, virtual volume device driver 532 handles the block IO operation in the same manner as described above when the block IO operation was directly passed to virtual volume device driver 532. Also, the target vvol is the same. The difference is in the data that is returned to the application as read data (filtered data is returned) and written as write data (filtered data is written).

The functions of control interface 511 are implemented with memory that is shared between filter appliance 513 and OS 508 (in particular, VIOI 531). Unidirectional queues are configured in the shared memory and each queue has a producer and a consumer. For reads, VIOI 531 is the producer and filter appliance 513 is the consumer. For writes, filter appliance 513 is the producer and VIOI 531 is the consumer.

Virtual volume device driver 532 issues raw block-level IO operations (as received from VIOI 531 or filter appliance 513) to data access layer 540. Data access layer 540 includes device access layer 534, which applies command queuing and scheduling policies to the raw block-level IO operations, and device driver 536 for HBA 504 which formats the raw block-level IO operations in a protocol-compliant format and sends them to HBA 504 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The PE ID is encoded in the first 2 bytes, which is conventionally used for the LUN ID, and the vvol information, in particular the SLLID, is encoded in the SCSI second level LUN ID, utilizing (a portion of) the remaining 6 bytes.

As further shown in FIG. 5A, data access layer 540 also includes an error handling unit 542 for handling IO errors that are received through the in-band path from the storage system. In one embodiment, the IO errors received by error handling unit 542 are propagated through the PEs by IO manager 304. Examples of IO error classes include path errors between computer system 101 and the PEs, PE errors, and vvol errors. The error handling unit 542 classifies all detected errors into aforementioned classes. When a path error to a PE is encountered and another path to the PE exists, data access layer 540 transmits the IO operation along a different path to the PE. When the IO error is a PE error, error handing unit 542 updates block device database 533 to indicate an error condition for each block device issuing IO operations through the PE. When the IO error is a vvol error, error handing unit 542 updates block device database 533 to indicate an error condition for each block device associated with the vvol. Error handing unit 542 may also issue an alarm or system event so that further IO operations to block devices having the error condition will be rejected.

Figure 5B:
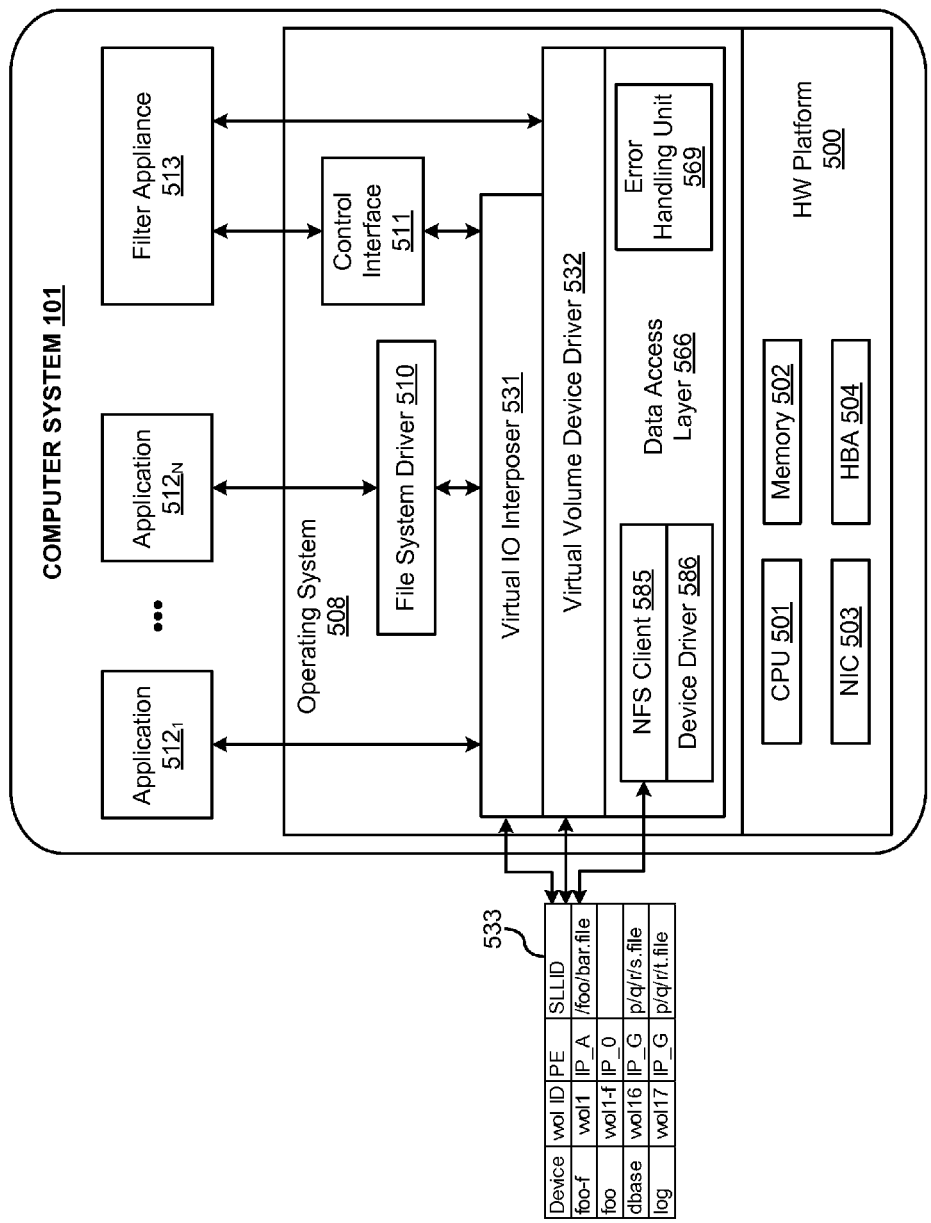
FIG. 5B is a block diagram of the computer system of FIG. 5A configured for virtual volumes hosted on a NAS-based storage system.

FIG. 5B is a block diagram of the computer system of FIG. 5A that has been configured to interface with the storage system cluster of FIG. 2B instead of the storage system cluster of FIG. 2A. In this embodiment, data access layer 540 includes an NFS client 545 and a device driver 546 for NIC 503. NFS client 545 maps the block device name to a PE ID (IP address of NAS storage system) and a SLLID which is a NFS file handle corresponding to the block device. This mapping is stored in block device database 533 as shown in FIG. 5B. It should be noted that the Active and CIF columns are still present but not illustrated in the block device database 533 shown in FIG. 5B. NFS client 545 also translates the raw block-level IO operations received from virtual volume device driver 532 to NFS file-based IO operations. Device driver 546 for NIC 503 then formats the NFS file-based IO operations in a protocol-compliant format and sends them to NIC 503, along with the NFS handle, for forwarding to one of the PEs.

Figure 5C:
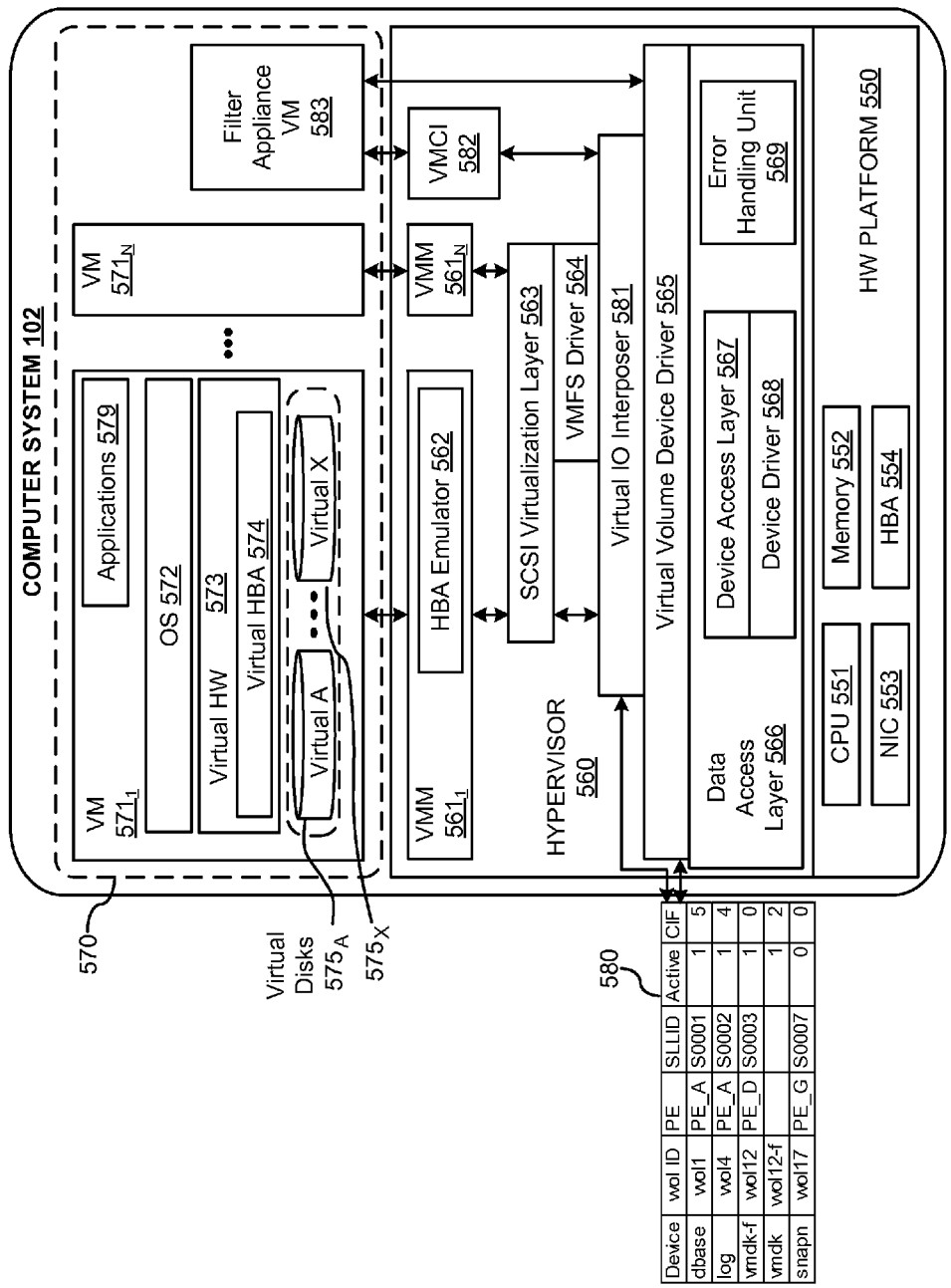
FIG. 5C is a block diagram of another embodiment of a computer system having a filter appliance and configured to implement virtual volumes hosted on a SAN-based storage system.

FIG. 5C is a block diagram of another embodiment of a computer system having a filter appliance and configured to implement virtual volumes. In this embodiment, computer system 102 is configured with virtualization software, shown herein as hypervisor 560. Hypervisor 560 is installed on top of hardware platform 550, which includes CPU 551, memory 552, NIC 553, and HBA 554, and supports a virtual machine execution space 570 within which multiple virtual machines (VMs) $571_1$-$571_N$ and a filter appliance VM 583 may be concurrently instantiated and executed. In one or more embodiments, hypervisor 560 and virtual machines 571, 583 are implemented using the VMware vSphere® product distributed by VMware, Inc. of Palo Alto, Calif. Each virtual machine 571 implements a virtual hardware platform 573 that supports the installation of a guest operating system (OS) 572 which is capable of executing applications 579. Examples of a guest OS 572 include any of the well-known commodity operating systems, such as Microsoft Windows, Linux, and the like. In each instance, guest OS 572 includes a native file system layer (not shown in FIG. 5C), for example, either an NTFS or an ext3FS type file system layer. These file system layers interface with virtual hardware platforms 573 to access, from the perspective of guest OS 572, a data storage HBA, which in reality, is virtual HBA 574 implemented by virtual hardware platform 573 that provides the appearance of disk storage support (in reality, virtual disks or virtual disks $575_A$-$575_X$) to enable execution of guest OS 572. In certain embodiments, virtual disks $575_A$-$575_X$ may appear to support, from the perspective of guest OS 572, the SCSI standard for connecting to the virtual machine or any other appropriate hardware connection interface standard known to those with ordinary skill in the art, including IDE, ATA, and ATAPI. Although, from the perspective of guest OS 572, file system calls initiated by such guest OS 572 to implement file system-related data transfer and control operations appear to be routed to virtual disks $575_A$-$575_X$ for final execution, in reality, such calls are processed and passed through virtual HBA 574 to adjunct virtual machine monitors (VMM) $561_1$-$561_N$ that implement the virtual system support needed to coordinate operation with hypervisor 560. In particular, HBA emulator 562 functionally enables the data transfer and control operations to be correctly handled by hypervisor 560 which ultimately passes such operations through its various layers to HBA 554 that connect to storage systems 130.

According to embodiments described herein, each VM 571 has one or more vvols associated therewith and issues IO operations to block device instances of the vvols created by hypervisor 560 pursuant to "CREATE DEVICE" calls by VM 571 into hypervisor 560. The association between block device names and vvol IDs are maintained in block device database 580. IO operations from VMs $571_2$-$571_N$ are received by a SCSI virtualization layer 563, which converts them into file IO operations understood by a virtual machine file system (VMFS) driver 564. VMFS driver 564 then converts the file IO operations to block IO operations, and provides the block IO operations to a virtual IO interposer (VIOI) 581. IO operations from VM $571_1$, on the other hand, are shown to bypass VMFS driver 564 and provided directly to VIOI 581, signifying that VM $571_1$ accesses its block device directly as a raw storage device, e.g., as a database disk, a log disk, a backup archive, and a content repository, in the manner described in U.S. Pat. No. 7,155,558.

Upon receipt of a block IO operation from one of VMs 571, VIOI 581 determines whether or not the block device name specified in the block IO operation is associated with a filtered vvol with reference to block device database 580. In the example illustrated in FIG. 5C, the block device name "vmdk" is shown to be associated with a filtered vvol, vvol12-f, whereas the block device names "dbase," "log," and "snapn" are not associated with filtered vvols. If the block device name specified in the block IO operation is not associated with a filtered vvol, VIOI 581 passes the block IO operation to a virtual volume device driver 565. In turn, virtual volume device driver 565 accesses block device database 580 to reference a mapping between the block device name specified in the IO operation and the PE ID (WWN of PE LUN) and SLLID that define the IO connection path to the vvol associated with the block device name. Other information that is stored in block device database 580 includes an active bit value for each block device that indicates whether or not the block device is active, and a CIF value.

If the block device name specified in the block IO operation received by VIOI 581 is associated with a filtered vvol, VIOI 581 redirects the block IO operation to filter appliance VM 583 for processing through a virtual machine control interface (VMCI) 582. Filter appliance VM 583 performs one or more filtering operations on the data referenced in the block IO operation. For reads, filter appliance VM 583 issues a block IO operation to virtual volume device driver 565 (identifying the block device name as "vmdk-f" in the example) and performs the filtering operations on the read data that is returned, and then passes the filtered read data back to VIOI 581 through control interface 582. For writes, filter appliance VM 583 transforms the write data that is referenced in the block IO operation by performing filtering operations thereon and issues a block IO operation to virtual volume device driver 565 (identifying the block device name as "vmdk-f" in the example) to write the transformed data. Then, upon receipt of a write acknowledgement, filter appliance VM 583 passes the write acknowledgement to VIOI 581 through control interface 582. For both reads and writes, upon receipt of the block IO operation from filter appliance VM 583, virtual volume device driver 565 handles the block IO operation in the same manner as described above when the block IO operation was directly passed to virtual volume device driver 565. Also, the target vvol is the same. The difference is in the data that is returned to the VM as read data (filtered data is returned) and written as write data (filtered data is written).

The functions of VMCI 582 are implemented with memory that is shared between filter appliance VM 583 and hypervisor 560 (in particular, VIOI 581). Unidirectional queues are configured in the shared memory and each queue has a producer and a consumer. For reads, VIOI 581 is the producer and filter appliance VM 583 is the consumer. For writes, filter appliance VM 583 is the producer and VIOI 581 is the consumer.

Virtual volume device driver 565 issues raw block-level IO operations (as received from VIOI 581 or filter appliance VM 583) to data access layer 566. Data access layer 566 includes device access layer 567, which applies command queuing and scheduling policies to the raw block-level IO operations, and device driver 568 for HBA 554 which formats the raw block-level IO operations in a protocol-compliant format and sends them to HBA 554 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The PE ID is encoded in the first 2 bytes, which is conventionally used for the LUN ID, and the vvol information, in particular the SLLID, is encoded in the SCSI second level LUN ID, utilizing (a portion of) the remaining 6 bytes. As further shown in FIG. 5C, data access layer 566 also includes an error handling unit 569, which functions in the same manner as error handling unit 542.

Figure 5D:
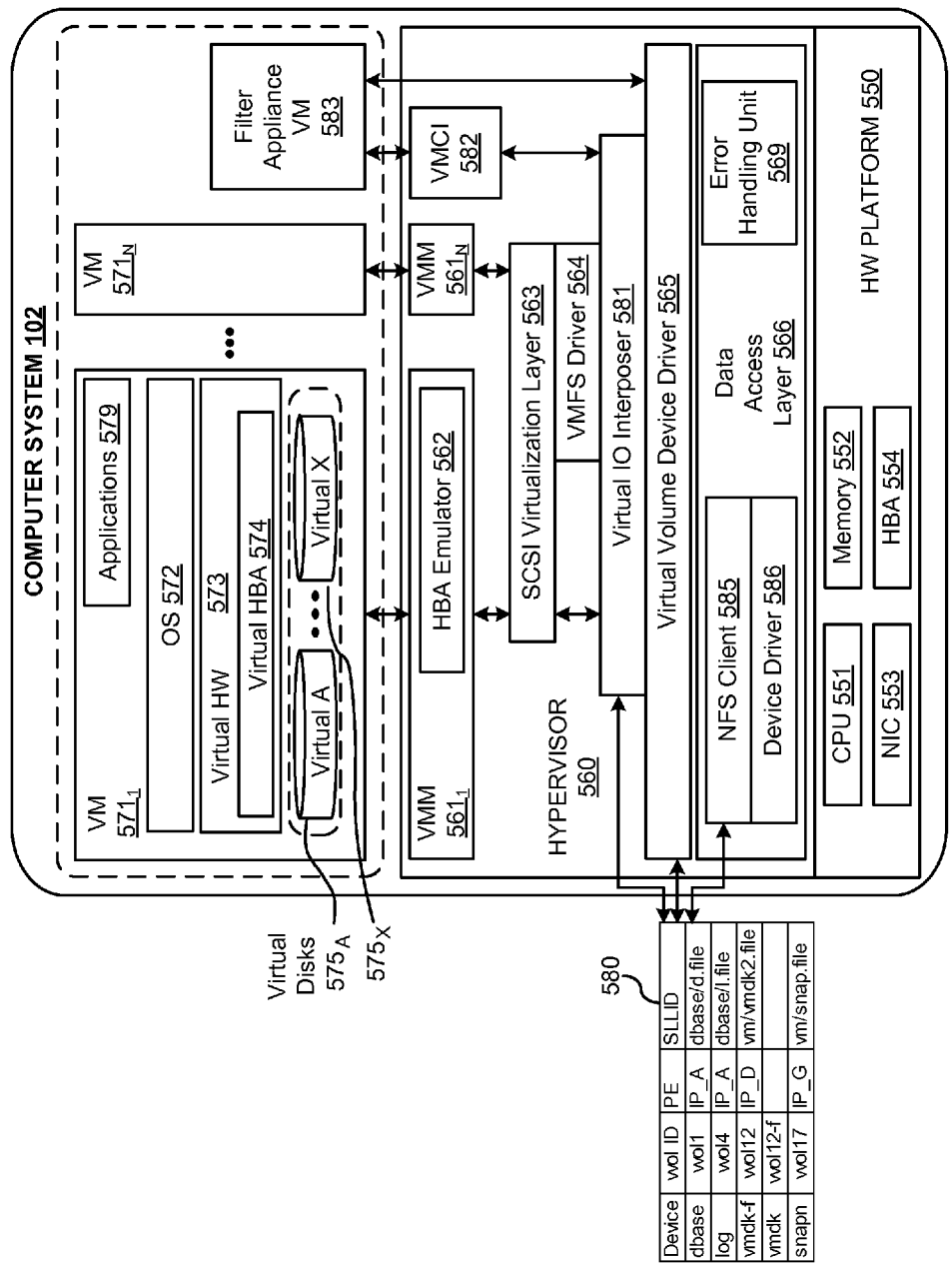
FIG. 5D is a block diagram of the computer system of FIG. 5C configured for virtual volumes hosted on a NAS-based storage system.

FIG. 5D is a block diagram of the computer system of FIG. 5C that has been configured to interface with the storage system cluster of FIG. 2B instead of the storage system cluster of FIG. 2A. In this embodiment, data access layer 566 includes an NFS client 585 and a device driver 586 for NIC 553. NFS client 585 maps the block device name to a PE ID (IP address) and SLLID (NFS file handle) corresponding to the block device. This mapping is stored in block device database 580 as shown in FIG. 5D. It should be noted that the Active and CIF columns are still present but not illustrated in the block device database 580 shown in FIG. 5D. NFS client 585 also translates the raw block-level IO operations received from virtual volume device driver 565 to NFS file-based IO operations. Device driver 586 for NIC 553 then formats the NFS file-based IO operations in a protocol-compliant format and sends them to NIC 553, along with the NFS handle, for forwarding to one of the PEs.

It should be recognized that the various terms, layers and categorizations used to describe the components in FIGS. 5A-5D may be referred to differently without departing from their functionality or the spirit or scope of the invention. For example, VMM 561 may be considered separate virtualization components between VM 571 and hypervisor 560 (which, in such a conception, may itself be considered a virtualization "kernel" component) since there exists a separate VMM for each instantiated VM. Alternatively, each VMM 561 may be considered to be a component of its corresponding virtual machine since such VMM includes the hardware emulation components for the virtual machine. In such an alternative conception, for example, the conceptual layer described as virtual hardware platform 573 may be merged with and into VMM 561 such that virtual host bus adapter 574 is removed from FIGS. 5C and 5D (i.e., since its functionality is effectuated by host bus adapter emulator 562).

Figure 6:
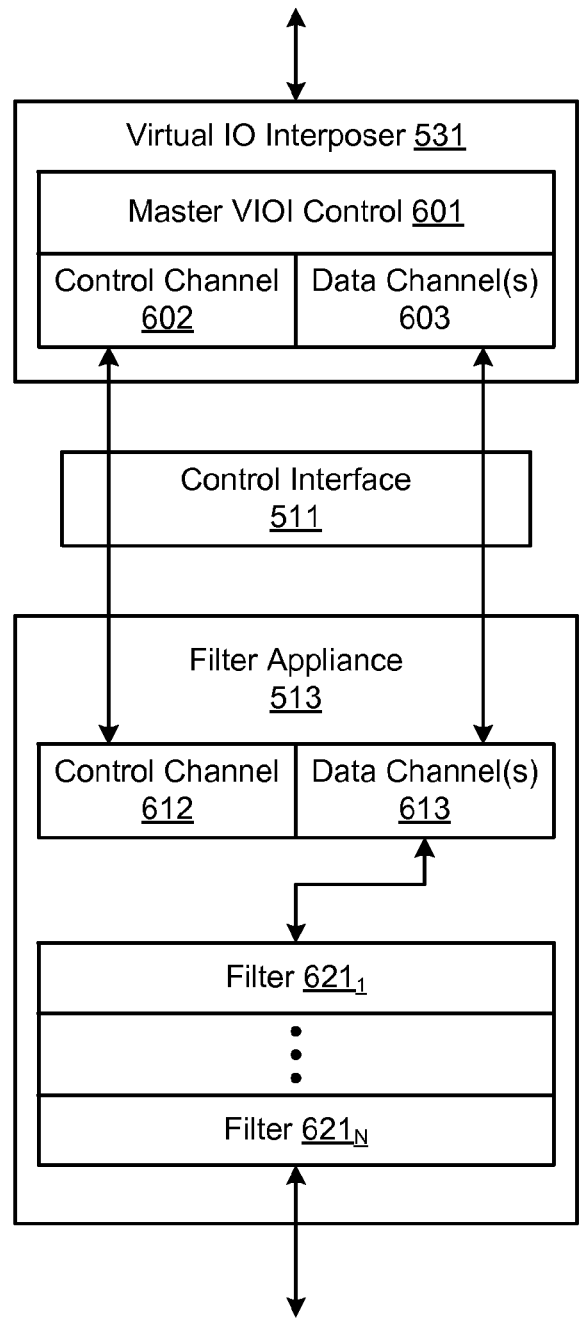
FIG. 6 is a conceptual diagram of components implemented in the computer systems of FIGS. 5A-5B that enable interposing on operations targeted for virtual volumes.

As shown in FIG. 6, VIOI 531 has several components, including a master VIOI control 601, a control channel 602, and one or more data channels 603. Master VIOI control 601 is responsible for registering filter appliance 513. When a new filter appliance is deployed in computer system 101, master VIOI control 601 registers the new filter appliance in a filter registry that is maintained in OS 508. Control channel 602 provides a communications link to a corresponding control channel 612 in filter appliance 513. Data channels 603/613 between VIOI 531 and filter appliance 513 are established using control channel 602/612, and IO data are transmitted over data channels 603/613. For reads, data read from a virtual volume are processed in sequence (upwards through the stack) by filters $621_1 \ldots 621_N$ and the processed data are transmitted over data channels 603/613. For writes, IO data received over data channels 603/613 are processed in sequence (downwards through the stack) by filters $621_1 \ldots 621_N$ and the processed IO data are written to a virtual volume. In one embodiment, filter $621_1$ is a compression/decompression filter and filter $621_2$ is a cache filter. In another embodiment, filter $621_1$ is an encryption/decryption filter and filter $621_2$ is a cache filter. In further embodiments, other types of filters may be implemented and in any number including 1. VIOI 581 is configured in a similar manner as VIOI 531 to register and communicate with filter appliance VM 583, and the details thereof are not described herein.

In the embodiments of FIGS. 5C and 5D, filter appliance VM 583, when successfully added to a host computer, is automatically powered on. When filter appliance VM 583 successfully boots, a storage rescan is performed on the host computer to discover storage containers accessible by the host computer including a filtered storage container that filter appliance VM 583 exports. The process of attaching a filter a VM so as to implement a new storage policy for the VM is carried out by logically moving all of the vvols associated with the VM to the filtered storage container exported by filter appliance VM 583. This logical move will cause all IO operations targeted for the moved vvols to flow through filter appliance VM 583 for filter processing by updating block device database in the manner described above for block device database 533 and block device database 580. The detach process is the reverse of the attach process. Given a VM associated with one or more vvols in the filtered storage container exported by filter appliance VM 583, when the storage policy for the VM no longer requires the filter processing by filter appliance VM 583, the vvols are logically moved from the filtered storage container exported by filter appliance VM 583 to an unfiltered storage container and the block device database is updated accordingly, as a result of which IO operations targeted for the moved vvols no longer flow through filter appliance VM 583.

Interposition of the filter in the IO data path described above allows a third party to design and implement any number of filters in a flexible manner. When multiple filters are provided, they can be stacked one above another in such a way that an upper filter gets to do its IO transformations before passing the transformed IO to the next lower filter in the stack. The completions will appropriately be called in the reverse order.

Figure 7:
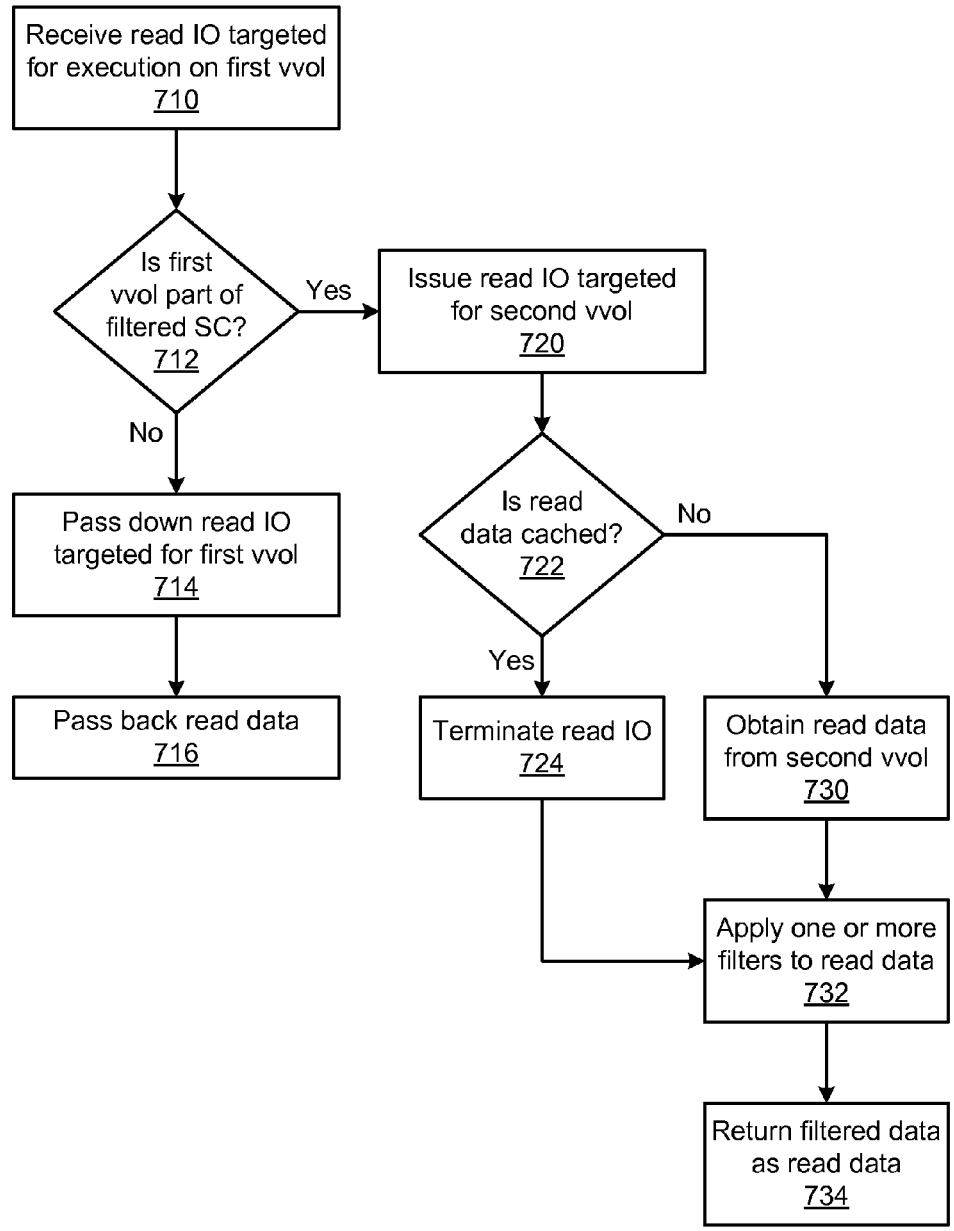
FIG. 7 is a flow diagram that illustrates a method of interposing on a read operation targeted for virtual volumes.
Figure 8:
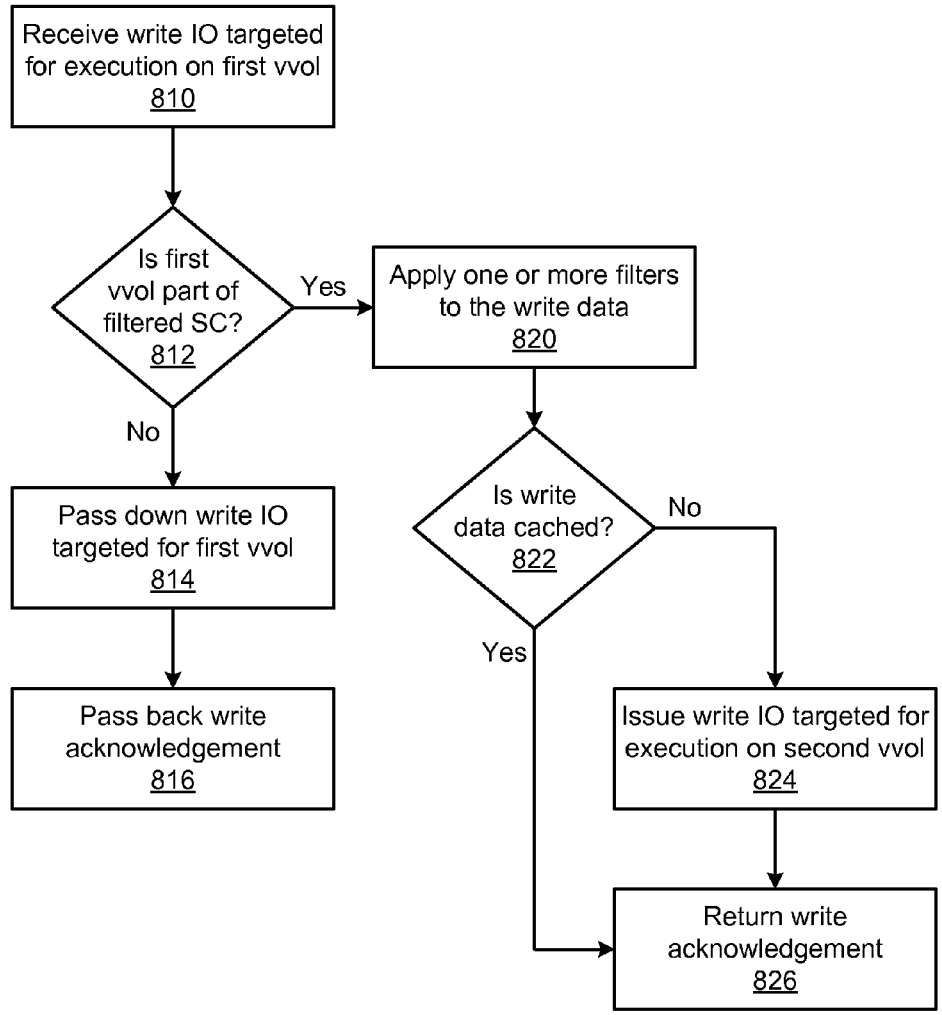
FIG. 8 is a flow diagram that illustrates a method of interposing on a write operation targeted for virtual volumes.

FIGS. 7 and 8 are flow diagrams that each illustrate a method of interposing on an IO operation targeted for virtual volumes, as carried out by a VIOI (e.g., VIOI 531 or VIOI 581) and a filter appliance (e.g., filter appliance 513 or filter appliance VM 583). FIG. 7 illustrates such a method for read IO operations, and FIG. 8 illustrates such a method for write IO operations. In addition, the filter appliance is assumed to implement multiple filters where the bottom filter is a cache filter.

At step 710, the VIOI receives a read IO operation that targets a first vvol. The first vvol may be part of an unfiltered storage container or may be a filtered vvol that was created as a result of a vvol being migrated from an unfiltered storage container to a filtered storage container. At step 712, the VIOI determines whether the first vvol is part of an unfiltered storage container or a filtered storage container. If the first vvol is part of an unfiltered storage container, step 714 is executed where the VIOI passes down its storage stack (e.g., to virtual volume device driver 532 or 565) a read IO operation targeting the first vvol. In response to this, read data is returned, and at step 716, the VIOI passes this read data back to the issuer of the read IO operation at step 710.

At step 712, if the VIOI determines that the first vvol is part of a filtered storage container, the filter appliance at step 720 issues a read IO operation targeting a second vvol, which is the vvol that was moved from an unfiltered storage container to the filtered storage container. For example, if vvol1 was migrated from an unfiltered storage container to a filtered storage container and the filtered version of vvol1 is known as vvol1-f, any read IO operation targeting vvol1-f would cause a read operation targeting vvol1 to be issued at step 720. At step 722, the filter appliance performs a first filter operation. It should be recognized that, for reads, the first filter is at the bottom of the filter stack (in this example, the cache filter). Therefore, the first filter operation is determining whether the read data is already cached. If so, the filter appliance terminates the issued read IO operation at step 724. If not, the filter appliance waits for read completion. Once the read has completed and the filter appliance obtains the read data from the second vvol at step 730, the filter appliance performs further filtering processing by applying the remaining filters on the read data one-by-one, working up the filter stack (step 732). After the top filter has been applied to the read data, the filter appliance at step 734 returns the filtered data as the read data to the issuer of the read IO operation at step 710.

At step 810, the VIOI receives a write IO operation that targets a first vvol. The first vvol may be part of an unfiltered storage container or may be a filtered vvol that was created as a result of a vvol being migrated from an unfiltered storage container to a filtered storage container. At step 812, the VIOI determines whether the first vvol is part of an unfiltered storage container or a filtered storage container. If the first vvol is part of an unfiltered storage container, step 814 is executed where the VIOI passes down its storage stack (e.g., to virtual volume device driver 532 or 565) a write IO operation targeting the first vvol. In response to this, a write acknowledgement is returned, and at step 816, the VIOI passes this write acknowledgement back to the issuer of the write IO operation at step 810.

At step 812, if the VIOI determines that the first vvol is part of a filtered storage container, the filter appliance begins filter processing on the write data referenced in the write IO operation by applying the filters to the write data one-by-one, working down the filter stack (step 820). In the example given herein, the bottom filter is the cache filter, which determines at step 822 whether the write data transformed by the upper filters is cached. If not, the filter appliance at step 824 issues a write IO operation to write the write data transformed by the upper filters to a second vvol, which is the vvol that was moved from an unfiltered storage container to the filtered storage container (e.g., vvol1 in the method described above in conjunction with FIG. 7). After step 824, the filter appliance waits for a write acknowledgement. Upon receiving it, the filter appliance at step 826 returns the write acknowledgement to the issuer of the write IO operation at step 810. If at step 822, the cache filter determines that the write data transformed by the upper filters is cached, step 824 is skipped and step 826 is executed.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. For example, SCSI is employed as the protocol for SAN devices and NFS is used as the protocol for NAS devices. Any alternative to the SCSI protocol may be used, such as Fibre Channel, and any alternative to the NFS protocol may be used, such as CIFS (Common Internet File System) protocol. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments described herein. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of interposing on operations targeted for execution on a logical storage volume, comprising:
   receiving, by a hypervisor, a read operation targeted for execution on a first logical storage volume;
   determining if the first logical storage volume is a filtered logical storage volume;
   if the first logical storage volume is not a filtered logical storage volume, issuing, by the hypervisor, the read operation targeted for execution on the first logical storage volume, and returning read data returned in response to the read operation as data responsive to the received read operation; and
   if the first logical storage volume is a filtered logical storage volume,
     redirecting, by the hypervisor, the read operation to an appliance virtual machine (VM), wherein the hypervisor supports a VM execution space within which a plurality of VMs and the appliance VM are instantiated and executed,
     issuing, by the hypervisor, a read operation targeted for execution on a second logical storage volume, in place of the read operation targeted for execution on the first logical storage volume,
     executing, by the appliance VM, one or more filtering operations in a filter stack on read data returned from the second logical storage volume in response to the read operation targeted for execution on the second logical storage volume, to generate transformed data, and
     returning the transformed data as data responsive to the received read operation targeted for execution on the first logical storage volume.

2. The method of claim 1, wherein one filtering operation is executed on the read data and includes one of a decryption operation and a decompression operation.

3. The method of claim 1, wherein at least two filtering operations are executed in sequence on the read data.

4. The method of claim 3, wherein said at least two filtering operations include a cache operation.

5. The method of claim 4, further comprising:
   terminating the issued read operation targeted for execution on the second logical storage volume if the read data has been cached.

6. The method of claim 1, wherein the read operation targeted for execution on the first logical storage volume is received from one of the plurality of VMs.

7. A method of interposing on operations targeted for execution on a logical storage volume, comprising:
   receiving, by a hypervisor, a write operation targeted for execution on a first logical storage volume;
   determining if the first logical storage volume is a filtered logical storage volume;
   if the first logical storage volume is not a filtered logical storage volume, issuing, by the hypervisor, the write operation targeted for execution on the first logical storage volume, and returning a write acknowledgment in response to the received write operation upon receiving confirmation that data referenced in the write operation has been written; and
   if the first logical storage volume is a filtered logical storage volume,
     redirecting, by the hypervisor, the write operation to an appliance virtual machine (VM), wherein the hypervisor supports a VM execution space within which a plurality of VMs and the appliance VM are instantiated and executed,
     executing, by the appliance VM, one or more filtering operations in a filter stack on the data referenced in the write operation to generate transformed data,
     issuing, by the hypervisor, a write operation to write the transformed data in a second logical storage volume in place of the write operation targeted for execution on the first logical storage volume, and
     returning a write acknowledgment in response to the received write operation upon receiving confirmation that the transformed data has been written.

8. The method of claim 7, wherein one filtering operation is executed on the data referenced in the received write operation and includes one of an encryption operation and a compression operation.

9. The method of claim 7, wherein at least two filtering operations are executed in sequence on the data referenced in the received write operation.

10. The method of claim 9, wherein said at least two filtering operations include a cache operation.

11. The method of claim 10, further comprising:
in response to a subsequent write operation targeted for execution on the first logical storage volume, executing said at least one filtering operation on data referenced in the subsequent write operation and returning a write acknowledgment without issuing any write operation if data generated from executing said at least one filtering operation on data referenced in the subsequent write operation is cached.

12. The method of claim 7, wherein the write operation targeted for execution on the first logical storage volume is received from one of the plurality of VMs.

13. A computer system having virtual machines (VMs) running therein, wherein one of the VMs is issuing input/output (TO) operations and another of the VMs is an appliance VM, and wherein the computer system includes one or more processors configured to perform operations comprising:
receiving, by a hypervisor supporting a VM execution space within which the VMs including the appliance VM are instantiated and executed, a read/write operation targeted for execution on a first logical storage volume;
determining if the first logical storage volume is a filtered logical storage volume;
if the first logical storage volume is not a filtered logical storage volume, issuing, by the hypervisor, the read/write operation targeted for execution on the first logical storage volume;
if the first logical storage volume is a filtered logical storage volume,
redirecting, by the hypervisor, the read/write operation to the appliance VM;
executing, by the appliance VM, one or more filtering operations in a filter stack on data that is read in response to a read operation or that is to be written pursuant to a write operation to generate transformed data; and
returning an indication of completion of the received read/write operation,
wherein the hypervisor includes a virtual TO interposer that receives the read/write operation targeted for execution on the first logical storage volume, determines whether or not the first logical storage volume is a filtered logical storage volume, and redirects the read/write operation targeted for execution on the first logical storage volume to the appliance VM if the first logical storage volume is a filtered logical storage volume, the hypervisor issuing a read/write operation targeted for execution on a second logical storage volume in place of the read operation targeted for execution on the first logical storage volume if the first logical storage volume is a filtered logical storage volume.

14. The method of claim 1, wherein the hypervisor includes a virtual input/output (TO) interposer that receives the read operation targeted for execution on the first logical storage volume and redirects the read operation to the appliance VM upon determining that the first logical storage volume is a filtered logical storage volume.

15. The method of claim 1, wherein one of the plurality of VMs issued the read operation, and the first logical storage volume is a virtual volume that is associated with a virtual disk of the VM that issued the read operation.

16. The method of claim 7, wherein one of the plurality of VMs issued the write operation, and the first logical storage volume is a virtual volume that is associated with a virtual disk of the VM that issued the write operation.

17. The method of claim 7, wherein the hypervisor includes a virtual input/output (TO) interposer that receives the write operation targeted for execution on the first logical storage volume and redirects the write operation to the appliance VM upon determining that the first logical storage volume is a filtered logical storage volume.

* * * * *